United States Patent
Vonsild et al.

(10) Patent No.: US 8,827,546 B2
(45) Date of Patent: Sep. 9, 2014

(54) METHOD FOR CALIBRATING A SUPERHEAT SENSOR

(75) Inventors: Asbjoern Leth Vonsild, Vejle (DK); Claus Thybo, Soenderborg (DK); Lars Finn Sloth Larsen, Sydals (DK); Jakob Spangberg, Soenderborg (DK); Jesper Hoeyer, Vejle (DK); Jes Vogler, Sydals (DK)

(73) Assignee: Danfoss A/S, Nordborg (DK)

( * ) Notice: Subject to any disclaimer, the term of this patent is extended or adjusted under 35 U.S.C. 154(b) by 335 days.

(21) Appl. No.: 13/062,048

(22) PCT Filed: Sep. 4, 2009

(86) PCT No.: PCT/DK2009/000198
§ 371 (c)(1),
(2), (4) Date: May 25, 2011

(87) PCT Pub. No.: WO2010/025728
PCT Pub. Date: Mar. 11, 2010

(65) Prior Publication Data
US 2011/0222576 A1 Sep. 15, 2011

(30) Foreign Application Priority Data
Sep. 5, 2008 (DK) .................... 2008 01236

(51) Int. Cl.
*G01K 13/02* (2006.01)
*F25B 49/00* (2006.01)
*F25B 41/06* (2006.01)

(52) U.S. Cl.
CPC ............. *F25B 41/062* (2013.01); *F25B 49/005* (2013.01); *F25B 2600/21* (2013.01); *F25B 2700/21175* (2013.01)
USPC .................. 374/1; 374/141; 374/45; 374/16; 374/100; 62/129

(58) Field of Classification Search
CPC .................... F25B 2700/21175; F25B 49/005; F25B 2341/0661; G01K 13/02
USPC .................. 374/100, 16, 1, 4, 5, 45, 141, 143
See application file for complete search history.

(56) References Cited

U.S. PATENT DOCUMENTS 2,497,677 A * 2/1950 Lathrop ........................ 62/212
4,106,306 A * 8/1978 Saunders ...................... 62/149

(Continued)

FOREIGN PATENT DOCUMENTS

EP 1 225 406 A2 7/2002
EP 1 811 249 A1 7/2007

OTHER PUBLICATIONS
International search report for PCT/DK2009/000198 dated Feb. 9, 2010.

*Primary Examiner* — Gail Kaplan Verbitsky
(74) *Attorney, Agent, or Firm* — McCormick, Paulding & Huber LLP

(57) ABSTRACT

A method for calibrating a superheat sensor (5) for a refrigeration system is provided. The method comprises the following steps. Increasing an amount of liquid refrigerant in the evaporator (1), e.g. by increasing an opening degree of the expansion valve (3). Monitoring one or more parameters, e.g. the temperature of refrigerant leaving the evaporator (1), said parameters reflecting a superheat value of the refrigerant. Allowing the value of each of the parameter(s) to decrease. When the value(s) of the monitored parameter(s) reaches a substantially constant level, defining the superheat value corresponding to the constant level to be SH=0. The superheat sensor (5) is then calibrated in accordance with the defined SH=0 level. When the parameter(s) reaches the substantially constant level it is an indication that liquid refrigerant is allowed to pass through the evaporator (1), and thereby that the superheat of the refrigerant leaving the evaporator (1) is zero. Calibration can be performed on site, and it is therefore not necessary to calibrate the sensor (5) at the manufacturing facility. Thereby it is no longer required to match calibration information with a specific sensor.

11 Claims, 6 Drawing Sheets

(56) References Cited

U.S. PATENT DOCUMENTS

| | | | |
|---|---|---|---|
| 4,432,492 A | 2/1984 | Kunz | |
| 4,660,387 A | 4/1987 | Usami | |
| 4,689,968 A * | 9/1987 | McCulloch et al. | 62/225 |
| 4,745,765 A * | 5/1988 | Pettitt | 62/129 |
| 5,070,706 A * | 12/1991 | Waters et al. | 62/129 |
| 5,333,469 A * | 8/1994 | Hullar et al. | 62/181 |
| 5,522,231 A | 6/1996 | Kenyon et al. | |
| 5,820,262 A * | 10/1998 | Lechner | 374/45 |
| 5,884,494 A * | 3/1999 | Okoren et al. | 62/126 |
| 6,015,453 A * | 1/2000 | Haugen et al. | 96/195 |
| 6,578,373 B1 * | 6/2003 | Barbier | 62/158 |
| 6,715,304 B1 | 4/2004 | Wycoff | |
| 7,770,406 B2 * | 8/2010 | Yoshioka et al. | 62/199 |
| 8,136,365 B2 * | 3/2012 | Kaga et al. | 62/228.4 |
| 2002/0014083 A1 * | 2/2002 | Scaringe | 62/129 |
| 2006/0021362 A1 | 2/2006 | Sadegh et al. | |
| 2007/0000264 A1 * | 1/2007 | Pritchard et al. | 62/208 |
| 2008/0190125 A1 * | 8/2008 | Yoshioka et al. | 62/208 |
| 2009/0151369 A1 * | 6/2009 | Lifson et al. | 62/115 |
| 2012/0198876 A1 * | 8/2012 | Funder-Kristensen et al. | 62/222 |

\* cited by examiner

METHOD FOR CALIBRATING A SUPERHEAT SENSOR

CROSS REFERENCE TO RELATED APPLICATIONS

This application is entitled to the benefit of and incorporates by reference essential subject matter disclosed in International Patent Application No. PCT/DK2009/000198 filed on Sep. 4, 2009, Danish Patent Application No. PA 2008 01236 filed on Sep. 5, 2008.

FIELD OF THE INVENTION

The present invention relates to a method for calibrating a superheat sensor for a refrigeration system. The superheat sensor being calibrated may advantageously be arranged in a refrigerant path of a refrigeration system, further having an expansion valve, an evaporator and a compressor arranged therein.

BACKGROUND OF THE INVENTION

Refrigeration systems are often operated by adjusting a degree of opening of an expansion valve and/or by opening/closing an expansion valve, thereby controlling the amount of liquid refrigerant being supplied to an evaporator. It is desirable to control the expansion valve in such a manner that it is obtained that all of the liquid refrigerant which is supplied to the evaporator is evaporated before exiting the evaporator, and in such a manner that mixed phase refrigerant is present at or immediately before the outlet of the evaporator. In the case that liquid refrigerant is allowed to exit the evaporator there is a risk that this liquid refrigerant reaches the compressor, and this may in some cases cause damage to the compressor. On the other hand, in the case that the liquid refrigerant evaporates while passing the first part of the evaporator, then the refrigeration capacity of the evaporator is not utilized to the full extent.

The superheat of the refrigerant provides information as to whether or not the situation described above has been obtained. Superheat is normally defined as the difference between the actual temperature of a fluid and the boiling point of the fluid. Accordingly, the superheat depends on the temperature as well as the pressure of the fluid. Thus, the superheat is a suitable parameter for controlling the opening degree of the expansion valve. It is normally desired that the refrigerant has a low, but positive, superheat. When this is the case, the situation described above is obtained, i.e. the refrigeration capacity of the evaporator is utilized to the greatest possible extent, and the risk of causing damage to the compressor due to liquid refrigerant being passed through the evaporator is minimised.

In order to be able to control the expansion valve in a manner which ensures that an optimum superheat of the refrigerant is maintained, it is necessary to be able to obtain an accurate measure for the superheat value. To this end it is necessary to calibrate the sensor or sensors used for measuring the superheat, or parameters used for calculating the superheat. This calibration should preferably be very accurate.

It has previously been attempted to obtain an accurate calibration of superheat sensors by performing an individual calibration of each superheat sensor at the factory manufacturing the sensors. This is cumbersome and increases the manufacturing costs. Furthermore, it is crucial that it is ensured that the calibration information is coupled to and follows a correct sensor. In some cases this has been done by storing the calibration information directly on the sensor, e.g. on a circuit board attached to the sensor. This increases the component count for the sensor, and it is cumbersome. In other cases the calibration information has been stored separately, e.g. in a corresponding controller. However, this introduces a considerable risk of introducing errors originating from a mismatch between a sensor and calibration information.

U.S. Pat. No. 5,820,262 discloses a refrigerant sensor that provides within a common assembly pressure temperature and superheat measurements and calculations. The refrigerant sensor includes a pressure transducer for measuring the pressure of the refrigerant material and a temperature transducer for measuring the temperature of the refrigerant material. The pressure and temperature measurements are used by a microprocessor to calculate the superheat value of the refrigerant material. The refrigerant sensor may contain capability for self-calibration. The calibrator calibrates the measurements of the pressure transducer and the temperature transducer based upon data contained within a pressure-temperature calibration data table. Within the pressure-temperature calibration data table, are pressure and temperature values which serve as checks for the measured values done by the pressure transducer and the temperature transducer. The pressure-temperature calibration data table contains a column of pressure values cross-correlated with a column of temperature values for performing the aforementioned calibration.

SUMMARY OF THE INVENTION

It is an object of the invention to provide a method for calibrating a superheat sensor, in which an accurate calibration is obtained.

It is a further object of the invention to provide a method for calibrating a superheat sensor, in which the risk of introducing errors is reduced as compared to prior art methods.

It is an even further object of the invention to provide a method for calibrating a superheat sensor, the method being less cumbersome to perform than prior art methods.

It is an even further object of the invention to provide a method for calibrating a superheat sensor, the method allowing the manufacturing costs of the sensor to be reduced.

According to the present invention the above and other objects are fulfilled by providing a method for calibrating a superheat sensor, the superheat sensor being arranged in a refrigeration system comprising an expansion valve, an evaporator and a compressor, the expansion valve, the evaporator, the superheat sensor and the compressor being fluidly interconnected in a refrigerant path having refrigerant flowing therein, the method comprising the steps of:

increasing an amount of liquid refrigerant in the evaporator, monitoring one or more parameters, said parameter(s) reflecting a superheat value of the refrigerant, allowing the value of each of said parameter(s) to change, when the value(s) of the monitored parameter(s) reaches a substantially constant level, defining the superheat value corresponding to said substantially constant level to be SH=0, and calibrating the superheat sensor in accordance with the defined SH=0 level.

When it is desired to calibrate a superheat sensor, the amount of liquid refrigerant in the evaporator is initially increased. This may, e.g., be done by increasing an opening degree of the expansion valve, by decreasing a rotational speed of the compressor or by decreasing a secondary fluid flow across the evaporator. This will be described in further detail below.

When the amount of liquid refrigerant in the evaporator is increased the boundary between liquid/mixed and gaseous refrigerant is moved towards the outlet of the evaporator. As a consequence the superheat value of the refrigerant leaving the evaporator decreases. Accordingly, a parameter which reflects the superheat value of the refrigerant will change.

When the boundary between liquid/mixed and gaseous refrigerant reaches the outlet of the evaporator, a small quantity of liquid refrigerant will pass through the outlet of the evaporator, and the superheat of the refrigerant leaving the evaporator is zero. If a continued increase of the amount of liquid refrigerant in the evaporator is allowed, the quantity of liquid refrigerant passing through the outlet of the evaporator also increases. However, the superheat value of the refrigerant leaving the evaporator remains at the zero level. Thus, a parameter which reflects the superheat value of the refrigerant will reach a substantially constant level when this situation occurs.

Thus, when the amount of liquid refrigerant in the evaporator is increased and one or more parameters reflecting the superheat value is monitored, the following will be observed. Initially, the parameter(s) will change as a consequence of the decreasing superheat value, and then the parameter(s) will reach a substantially constant level, due to the superheat value of the refrigerant reaching the constant zero level. This level can then be used for calibrating the superheat sensor.

Preferably, the amount of liquid refrigerant in the evaporator is increased sufficiently to allow a superheat sensor arranged downstream relative to the evaporator to receive liquid refrigerant, i.e. sufficiently to allow the superheat sensor to be 'flooded'.

Since the amount of liquid refrigerant which is allowed to pass through the evaporator is very limited, and since this is only allowed for a very limited time, the risk of causing damage to the compressor is minimised.

It is an advantage that the method of the present invention is performed while the superheat sensor is arranged in a refrigerant path. Thereby the superheat sensor can be calibrated on site, and it is possible to repeat the calibration at any time it is considered necessary. Thereby it is not necessary to calibrate the superheat sensor at the manufacturing site, and the disadvantages described above are avoided. Thus, it is no longer necessary to keep track of calibration information in order to ensure that matching pairs of sensors and calibration information are kept together, and a major source of possible errors is thereby eliminated. Furthermore, the manufacturing costs can be lowered because the process line does no longer need to be designed to handle this, and because the manufacturer no longer needs to perform the calibration.

Furthermore, the calibration method of the present invention can be performed repeatedly as often as considered necessary, e.g. at various pressure and/or temperature regimes or simply to counteract drifting of the sensor. Thereby a relatively accurate calibration of the superheat sensor can be obtained.

Finally, using the substantially constant zero level of the superheat value as a reference point for the calibration provides an accurate calibration of the sensor.

The step of increasing an amount of liquid refrigerant in the evaporator may comprise increasing an opening degree of the expansion valve. The expansion valve of a refrigeration system is normally arranged in such a manner that it controls the flow of refrigerant supplied to the evaporator. Thus, when the opening degree of the expansion valve is increased the refrigerant supply to the evaporator is also increased.

The step of increasing an opening degree of the expansion valve may be performed by gradually increasing the opening degree, e.g. in a smooth manner. Alternatively, the opening degree of the expansion valve may be increased abruptly.

As an alternative, the step of increasing an amount of liquid refrigerant in the evaporator may comprise decreasing a secondary fluid flow across the evaporator. The evaporator of a refrigeration system has a heat exchanging function, i.e. heat exchange takes place between the refrigerant flowing in the refrigerant flow path through the evaporator and a secondary fluid flow flowing across the evaporator, but not in the refrigerant flow path. The secondary fluid flow may be a liquid flow or a gaseous flow, e.g. in the form of air being blown across the evaporator. In the latter case, a fan is normally arranged to cause the flow of air across the evaporator. In this case the secondary fluid flow across the evaporator may be decreased by reducing the rotational speed of the fan, possibly turning it off completely.

Decreasing the secondary fluid flow reduces the load on the refrigeration system, and thereby the evaporation of refrigerant in the evaporator is reduced. As a consequence, the amount of liquid refrigerant in the evaporator is increased.

As another alternative, the step of increasing an amount of liquid refrigerant in the evaporator may comprise decreasing a rotational speed of the compressor. When the rotational speed of the compressor is decreased the suction pressure of the refrigeration system is increased. The increased suction pressure causes the evaporation temperature to increase, thereby reducing the temperature difference across the evaporator of the refrigerant. Thereby the evaporation of refrigerant is decreased, and this increases the amount of liquid refrigerant in the evaporator.

The step of monitoring one or more parameters may comprise monitoring a temperature of refrigerant leaving the evaporator. When the amount of liquid refrigerant in the evaporator is increased as described above, the temperature of refrigerant leaving the evaporator will, at a given pressure, behave in the following manner. Initially, the temperature will decrease because the boundary between the liquid/mixed refrigerant and the gaseous refrigerant moves towards the outlet of the evaporator. Thereby the temperature of the gaseous refrigerant is allowed less and less time to increase in temperature after evaporation, hence the reduced temperature. When the amount of liquid refrigerant in the evaporator is sufficient to allow liquid refrigerant to pass through the evaporator, the temperature of refrigerant leaving the evaporator reaches a substantially constant level corresponding to the evaporation temperature of the refrigerant at the pressure of the refrigerant. Thus, when the monitored temperature reaches a substantially constant level, it is an indication that the superheat of the refrigerant leaving the evaporator has reached the zero level, and the superheat sensor can be calibrated accordingly.

Alternatively or additionally, the step of monitoring one or more parameters may comprise monitoring a distance between a first wall part and a second wall part of the superheat sensor, said distance depending on a pressure as well as a temperature of refrigerant leaving the evaporator. According to this embodiment the superheat sensor is of a kind which is capable of directly obtaining a measure for the superheat of the refrigerant leaving the evaporator. The superheat sensor may, e.g., be of a kind comprising a flexible wall defining an interface between a cavity having a charge fluid arranged therein in thermal contact with the refrigerant and the refrigerant flow path. Thus, the temperature of the refrigerant determines the pressure inside the cavity, and the position of the flexible wall is determined by a balance between the pressure of the refrigerant in the refrigerant flow path and the pressure inside the cavity, which is determined by the temperature of the refrigerant. Hence the position of the flexible wall is a direct measure for the superheat of the refrigerant. The flexible wall may, e.g., be a diaphragm or a bellow.

The method may further comprise the step of storing the result of the calibrating step in a database. In this case the step of calibrating the superheat sensor may further be performed on the basis of information previously stored in the database. The calibration of the superheat sensor may, e.g., be performed at various pressures, and the results may be used for providing an accurate calibration covering a wide pressure range.

The step of calibrating the superheat sensor may comprise solving a linear equation. The linear equation may, e.g., be of the type $$SH = a_1 U_P + a_2 U_T + b,$$

wherein $U_P$ is a parameter representing the pressure of the refrigerant, $U_T$ is a parameter representing the temperature of the refrigerant, and $a_1$, $a_2$ and b are constants. In this case the pressure and the temperature of the refrigerant are obtained separately. $a_1$ and $a_2$ are often known with a certain tolerance, while b is typically determined by performing the calibration method of the present invention.

In the case that the calibration method has been performed, e.g., at three different pressure levels, the equation $SH = a_1 U_P + a_2 U_T + b$ can be solved as three equations with three unknown, thereby determining all of the three constants and obtaining a more accurate calibration of the sensor. This is, however, not necessary in order to obtain a satisfactory calibration for most purposes.

As an alternative, the linear equation may be of the type $$SH = aU_1 + b,$$

wherein $U_1$ is a parameter representing the superheat of the refrigerant leaving the evaporator, and a and b are constants. In this case the monitored parameter is a direct measure for the superheat of the refrigerant, e.g. in the form of a distance between two wall parts of the superheat sensor as described above.

As another alternative, other types of functions may be used, e.g. a quadratic function.

The step of monitoring one or more parameters may be performed by means of the superheat sensor. As an alternative, one or more parameters may be monitored using one or more additional sensors, e.g. a temperature sensor.

BRIEF DESCRIPTION OF THE DRAWINGS

The invention will now be described in further detail with reference to the accompanying drawings in which.

DETAILED DESCRIPTION

Figure 1:
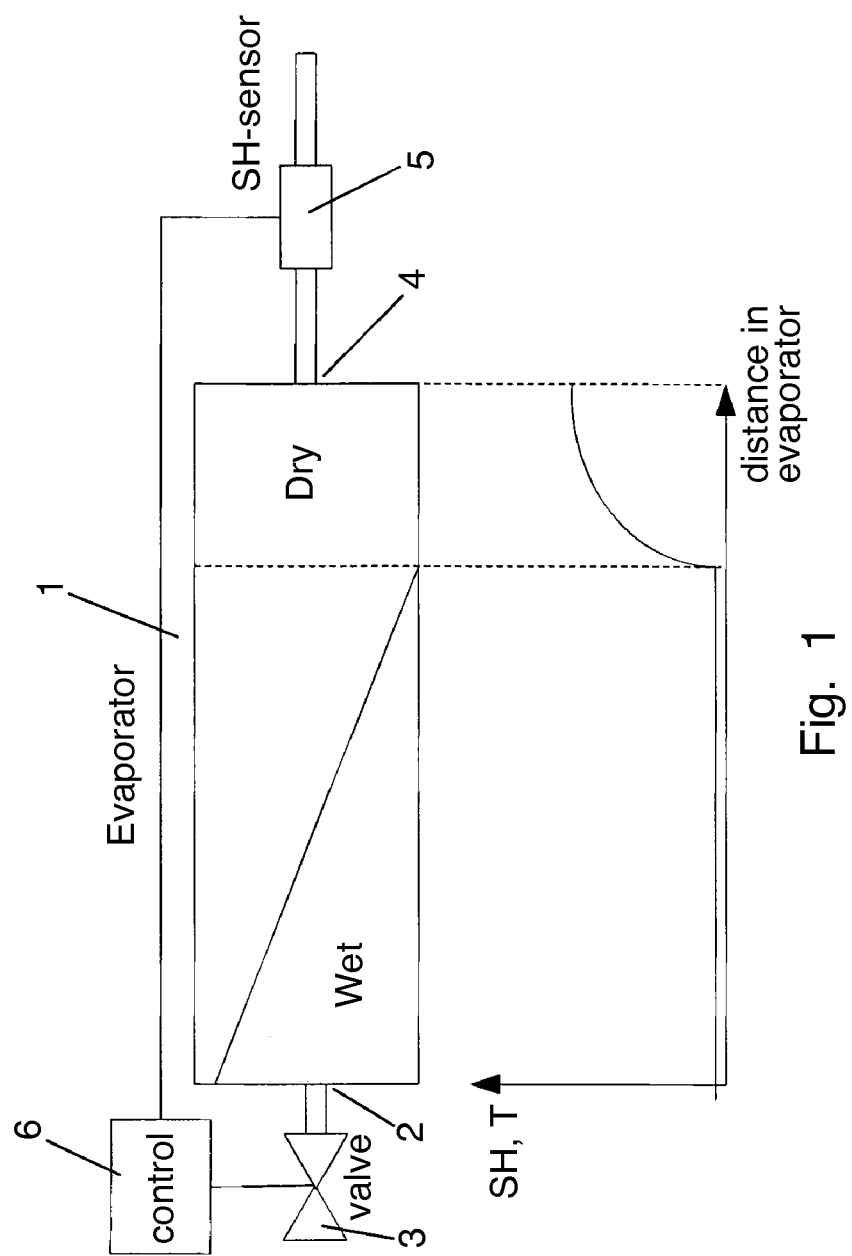
FIG. 1 is a schematic illustration of an evaporator of a refrigeration system under normal operating conditions.

FIG. 1 is a schematic view of an evaporator 1 arranged in a refrigeration path of a refrigeration system. The evaporator 1 comprises an inlet 2 which is fluidly connected to an expansion valve 3. The opening degree of the expansion valve 3 determines the supply of refrigerant to the evaporator 1. The evaporator 1 further comprises an outlet 4 which is fluidly connected to a superheat sensor 5.

The superheat sensor 5 measures one or more parameters which is/are relevant to the superheat of the refrigerant leaving the evaporator 1 via the outlet 4. The superheat sensor 5 may measure corresponding values of the temperature and the pressure of the refrigerant leaving the evaporator 1. Alternatively, the superheat sensor 5 may be adapted to measure a single parameter which is representative for the superheat of the refrigerant leaving the evaporator 1.

The superheat sensor 5 supplies the result of such measurements to a control unit 6. Based on the received results the control unit 6 generates a control signal to the expansion valve 3, thereby controlling the opening degree of the expansion valve 3 in accordance with the superheat value and in order to obtain a small, but positive, superheat value, thereby obtaining an optimal operation of the refrigeration system. The control unit 6 may calculate the superheat of the refrigerant leaving the evaporator 1 based on the results supplied by the superheat sensor 5 and subsequently use the calculated superheat value for controlling the expansion valve 3. Alternatively, the control unit 6 may control the expansion valve 3 directly on the basis of the measurements performed by the superheat sensor 5.

It is clear from FIG. 1 that the evaporator 1 contains refrigerant in a liquid phase as well as refrigerant in a gaseous phase. The refrigerant near the inlet 2 is mainly liquid, and the refrigerant near the outlet 4 is mainly gaseous. In between the refrigerant is in a mixed state, i.e. it is a mixture of liquid and gaseous refrigerant.

The graph of FIG. 1 illustrates the superheat temperature of the refrigerant as a function of position along the evaporator 1. It is clear from the graph that as long as the refrigerant is in a liquid or mixed state the superheat temperature remains at a substantially constant zero level. However, as soon as the refrigerant is in a purely gaseous phase, the superheat value starts to increase.

Figure 2A:
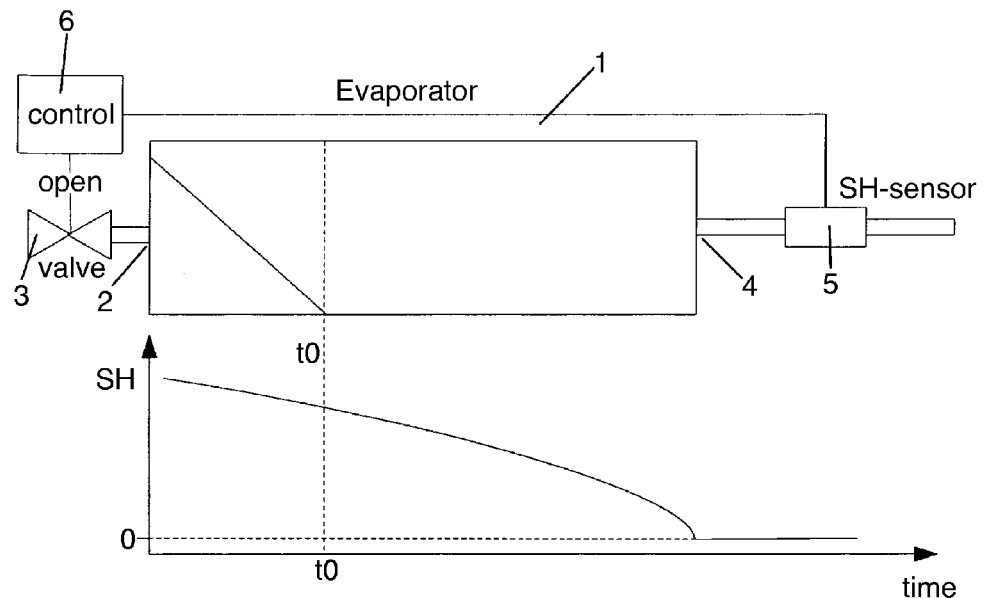
FIGS. 2a-2d illustrate the evaporator of FIG. 1 during calibration.

FIGS. 2a-2d illustrate the evaporator 1 of FIG. 1 during calibration. In FIG. 2a most of the evaporator 1 contains refrigerant in a gaseous phase. Thus, the refrigeration system illustrated in FIG. 2a is operated with low efficiency. The graph of FIG. 2a illustrates the superheat of the refrigerant leaving the evaporator 1 as a function of time during calibration of the superheat sensor 5. The graph shows that the superheat of the refrigerant leaving the evaporator 1 in this situation is relatively high.

Figure 2B:
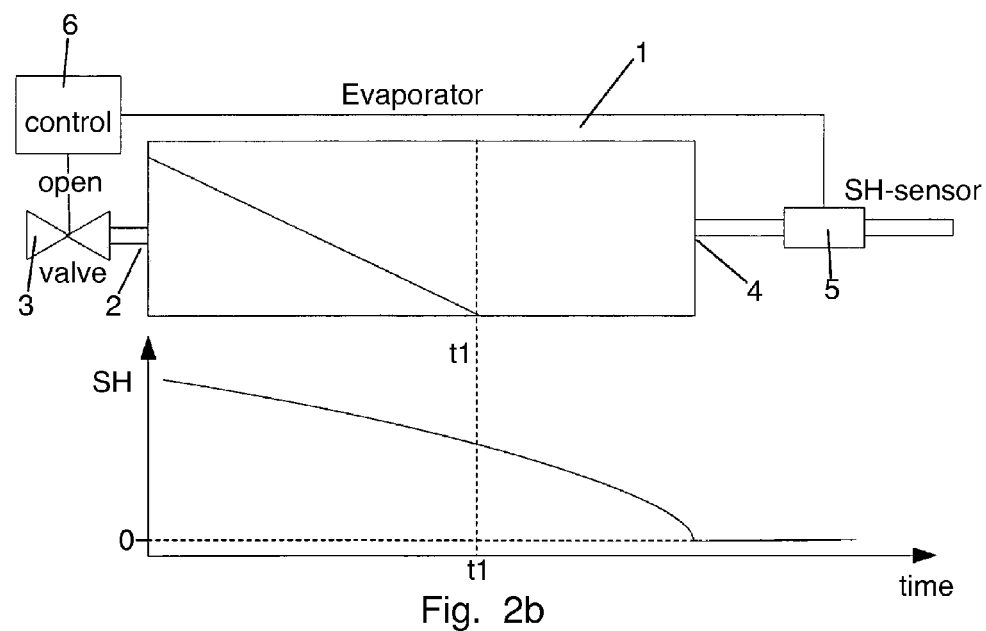

In FIG. 2b the amount of liquid refrigerant in the evaporator 1 has been increased, e.g. by increasing an opening degree of the expansion valve 3. It can be seen that the boundary between liquid/mixed phase refrigerant and gaseous refrigerant has moved closer to the outlet opening 4. However, a relatively large part of the evaporator 1 still comprises refrigerant in a gaseous phase. The graph shows that the superheat of the refrigerant leaving the evaporator 1 has decreased as compared to the situation illustrated in FIG. 2a. However, the superheat is still relatively high.

Figure 2C:
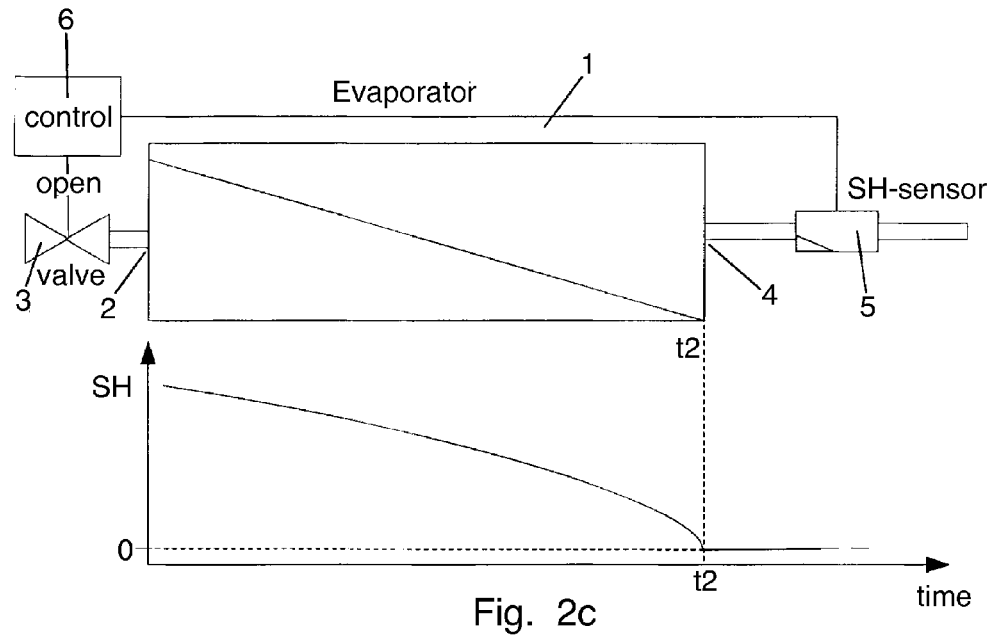

In FIG. 2c the amount of liquid refrigerant in the evaporator 1 has been even further increased. It can be seen that the boundary between the liquid/mixed phase refrigerant and the gaseous phase refrigerant is exactly at the position of the outlet opening 4, i.e. the refrigeration system is being operated in an optimal manner. The graph illustrates that the superheat of the refrigerant leaving the evaporator 1 in this situation exactly reaches the zero level. The graph further shows that the derivative of the superheat with respect to time has a discontinuity in this point. This discontinuity can be observed, thereby providing a precise indication that the optimal operating conditions have been reached. It can be seen that a small amount of liquid refrigerant has been allowed to pass through the evaporator 1 and enter the superheat sensor 5.

Figure 2D:
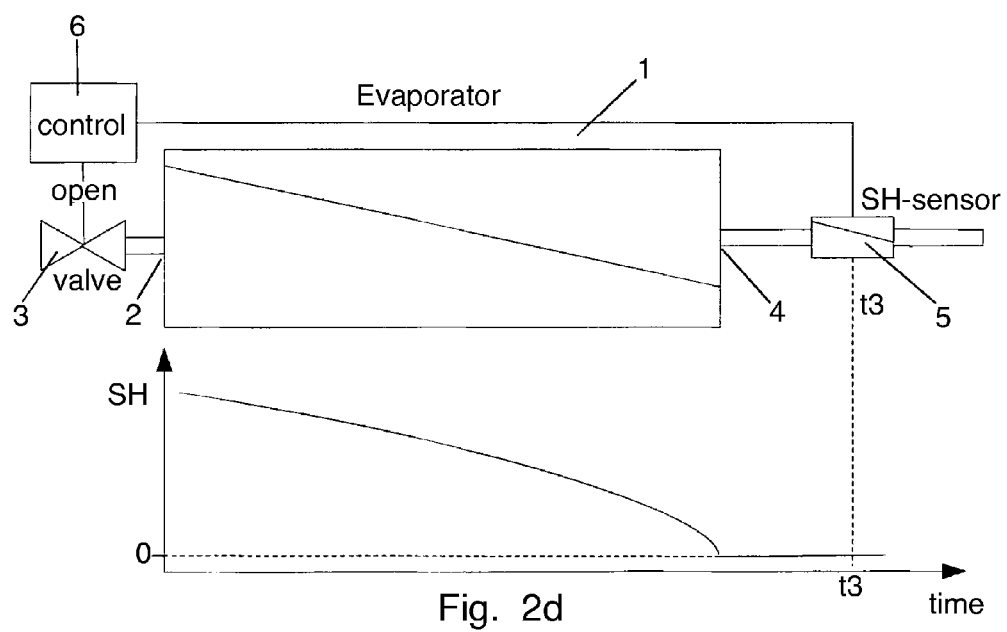

In FIG. 2d the amount of liquid refrigerant in the evaporator 1 has been even further increased, and an even larger amount of liquid refrigerant has been allowed to pass through the evaporator 1 and enter the superheat sensor 5. Thus, the superheat sensor 5 has been 'flooded' by liquid refrigerant. The graph shows that the superheat of the refrigerant leaving the evaporator 1 has reached a substantially constant zero level. The superheat value measured by the superheat sensor 5 in this situation can therefore be set to zero, and thereby the superheat sensor 5 can be calibrated. Once the calibration has been performed, the amount of liquid refrigerant in the evaporator 1 can be reduced, and the system can return to normal operating conditions.

Figure 3:
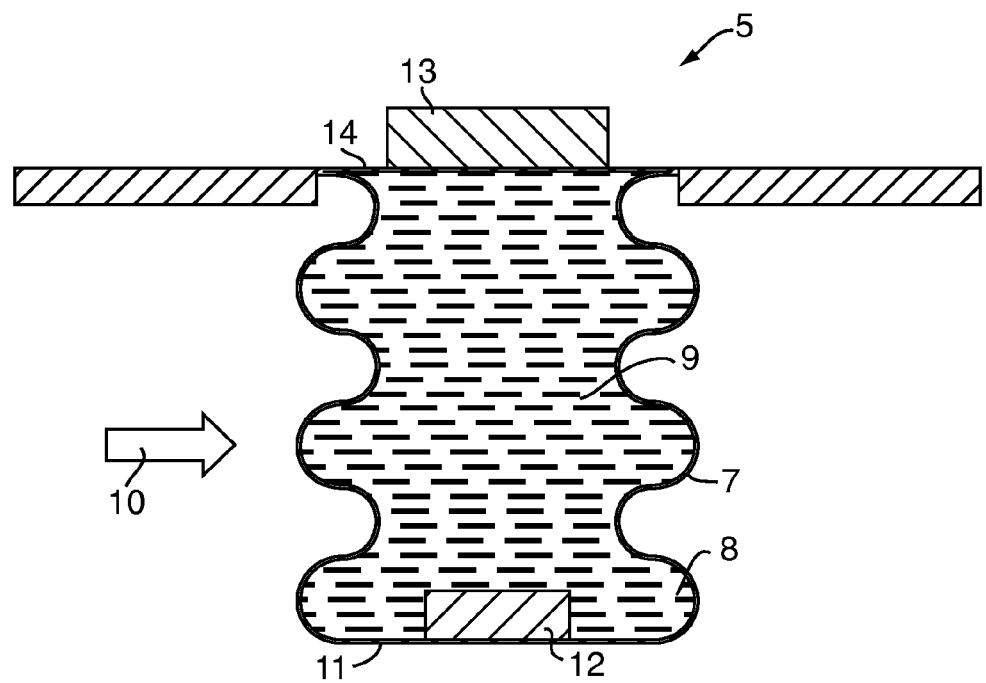
FIGS. 3-7 show various examples of superheat sensors which may be calibrated using the method of the invention.

FIG. 3 shows a first example of a superheat sensor 5 for use in a refrigeration system. The superheat sensor 5 comprises a bellow 7 enclosing an inner cavity 8 having a charge fluid 9 arranged therein. The charge fluid 9 may advantageously have thermostatic properties which are similar to the thermostatic properties of the refrigerant flowing in a refrigerant path of the refrigeration system. Most preferably, the charge fluid 9 is identical to the refrigerant.

The superheat sensor 5 is arranged in a refrigerant flow path with a refrigerant flow illustrated by arrow 10.

The bellow 7 is thermally conductive, and therefore the temperature of the charge fluid 9 adapts to the temperature of the refrigerant. Since the inner cavity 8 is substantially closed, the pressure inside the inner cavity 8 is determined by this temperature.

The bellow 7 expands and contracts in accordance with the pressure inside the inner cavity 8 and the pressure in the refrigerant flow path. Accordingly, the position of a first wall part 11 is determined by a balance between these two pressures, i.e. the position is determined by the temperature as well as the pressure of the refrigerant. Thus, the position of the first wall part 11 is a measure for the superheat of the refrigerant.

A permanent magnet 12 is arranged on the first wall part 11 and a Hall element 13 is arranged on a second wall part 14. The position of the first wall part 11 determines a distance between the first wall part 11 and the second wall part 14, and this distance can be measured by the Hall element 13 because the permanent magnet 12 is arranged on the first wall part 11. Thus, the superheat sensor 5 of FIG. 3 is adapted to provide a direct measure for the superheat of the refrigerant.

Figure 4:
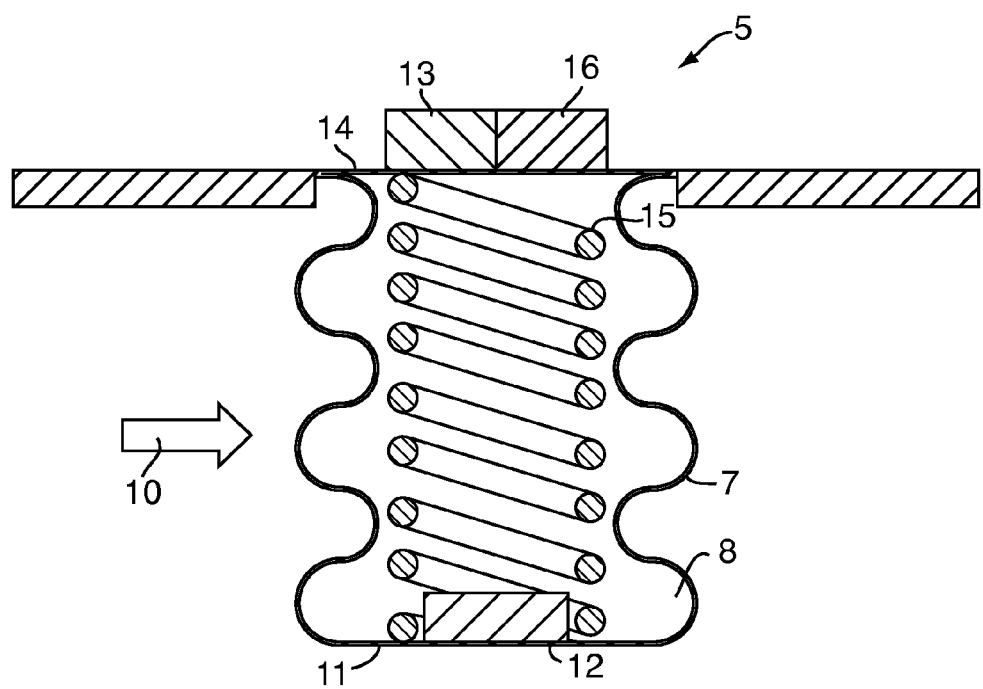

FIG. 4 shows a second example of a superheat sensor 5 for use in a refrigeration system. The superheat sensor 5 of FIG. 4 is similar to the superheat sensor 5 of FIG. 3 in that it also comprises a bellow 7, a permanent magnet 12 and a Hall element 13. However, the superheat sensor 5 of FIG. 4 is provided with a compressible spring 15 arranged inside the inner cavity 8. The compressible spring 15 biases the first wall part 11 in a direction away from the second wall part 14. In the superheat sensor 5 of FIG. 4 it is not necessary to arrange a charge fluid in the inner cavity 8, although this is not ruled out. A temperature sensor 16 is arranged on the second wall part 14 for measuring the temperature of the refrigerant. Thus, the pressure of the refrigerant can be measured by measuring the distance between the first wall part 11 and the second wall part 14 by means of the permanent magnet 12 and the Hall element 13, and the temperature of the refrigerant can be measured by means of the temperature sensor 16. The superheat of the refrigerant can be calculated on the basis of these two measurements.

Figure 5:
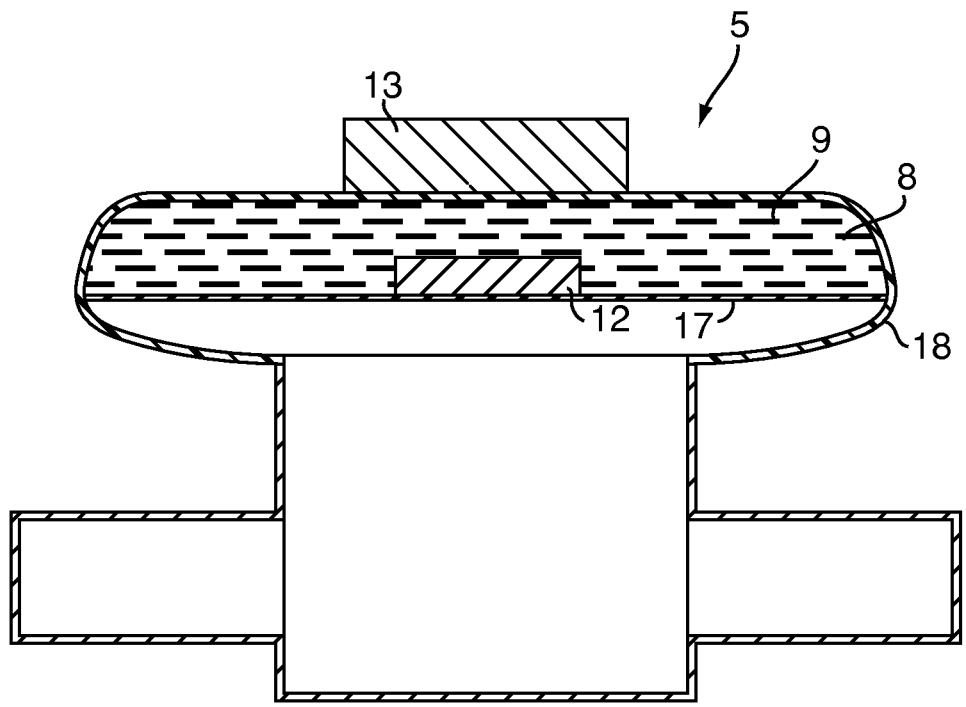

FIG. 5 shows a third example of a superheat sensor 5 for use in a refrigeration system. The superheat sensor 5 comprises a diaphragm 17 arranged in a housing 18 in such a manner that an inner cavity 8 comprising a charge fluid 9 is delimited from the refrigerant flowing in the refrigerant flow path. The diaphragm 17 is thermally conductive, and the temperature of the charge fluid 9 therefore adapts to the temperature of the refrigerant flowing in the flow path. Similarly to the situation described above with reference to FIG. 3, the pressure inside the inner cavity 8 is therefore determined by the temperature of the refrigerant. The position of the diaphragm 17 is determined by a balance between the pressure of the refrigerant in the refrigerant flow path and the pressure inside the inner cavity 8. Thus, the position of the diaphragm 17 is determined by the pressure as well as the temperature of the refrigerant, and it is therefore a measure for the superheat of the refrigerant.

A permanent magnet 12 is arranged on the diaphragm 17 and a Hall element 13 is arranged on a wall of the housing 18 opposite the permanent magnet 12. Thus, the distance between the diaphragm 17 and the wall having the Hall element 13 arranged thereon, and thereby the superheat of the refrigerant, can be measured by means of the Hall element 13.

Figure 6:
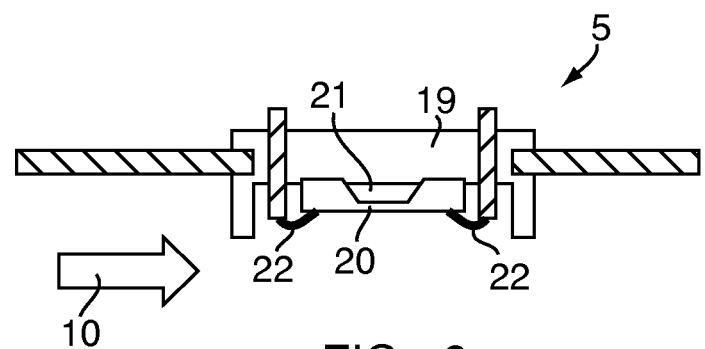

FIG. 6 shows a fourth example of a superheat sensor 5 for use in a refrigeration system. The superheat sensor 5 comprises a silicon chip 19 mounted in the refrigerant flow path. At a centre part of the silicon chip 19 a diaphragm 20 is arranged in such a manner that a cavity 21 is formed. Inside the cavity 21 a substantially constant pressure is maintained, typically a very low pressure or substantially vacuum. The diaphragm 20 deflects in response to a pressure difference between the pressure in the cavity 21 and the pressure in the refrigerant flow path. Since the pressure in the cavity 21 is substantially constant, the deflection of the diaphragm 20 is a measure for the pressure of the refrigerant flowing in the refrigerant flow path.

A strain gauge (not visible) is mounted on the diaphragm 20 for measuring the deflection of the diaphragm 20. The strain gauge is connected to a measuring unit via wires 22. In order to obtain information regarding the temperature of the refrigerant the strain gauge comprises a bridge circuit (not visible) comprising four resistors which have been doped into the surface of the silicon chip 19 at the position of the diaphragm 20. The resistors are arranged in such a manner that when the pressure of the refrigerant increases, the resistance of two of the resistors increases while the resistance of the other two resistors decreases, and in such a manner that when the temperature increases, the resistance of all four resistors increases (or decreases). Thereby the pressure as well as the temperature of the refrigerant can be derived, or at least estimated, from a measurement performed by the strain gauge, and thereby a measure for the superheat can be obtained.

Figure 7:
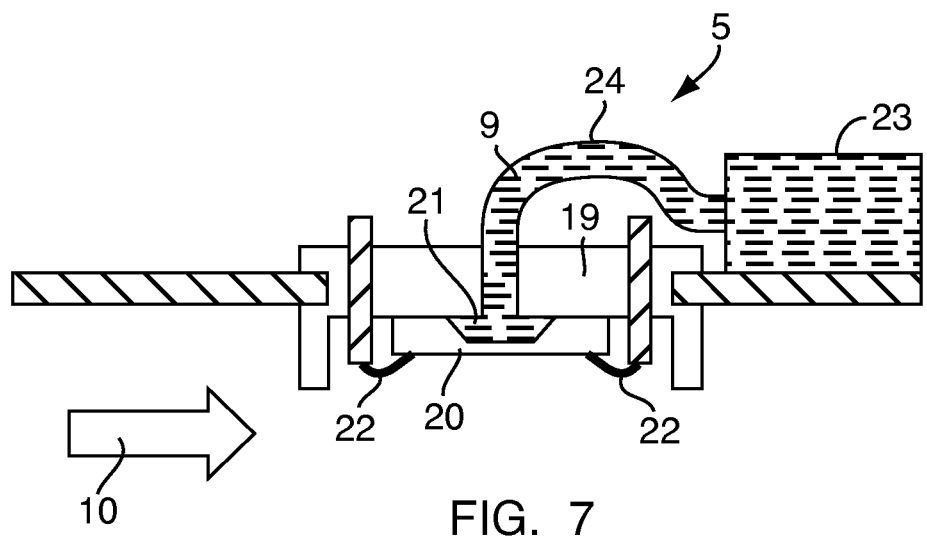

FIG. 7 shows a fifth example of a superheat sensor 5 for use in a refrigeration system. The superheat sensor 5 of FIG. 7 is similar to the superheat sensor 5 of FIG. 6. However, in this case a charge fluid 9 is arranged in the cavity 21. The charge fluid 9 is provided from a pressure bulb 23 via a capillary tube 24.

The charge fluid 9 is thermally connected to the refrigerant flowing in the refrigerant flow path via the diaphragm 20. Thus, the temperature of the charge fluid 9 adapts to the temperature of the refrigerant, and thereby the pressure in the cavity 21 is determined by this temperature, similarly to the situation described above with reference to FIG. 5. Accordingly, the deflection of the diaphragm 20 which is measured by the strain gauge provides a direct measure for the superheat value of the refrigerant.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for calibrating a superheat sensor, the superheat sensor being arranged in a refrigeration system comprising an expansion valve, an evaporator and a compressor, the expansion valve, the evaporator, the superheat sensor and the compressor being fluidly interconnected in a refrigerant path having refrigerant flowing therein, the method comprising the steps of:
   increasing an amount of liquid refrigerant in the evaporator;
   monitoring one or more parameters, said parameter(s) reflecting a superheat value of the refrigerant;
   allowing the value of each of said parameter(s) to change;
   when the value(s) of the monitored parameter(s) reaches a substantially constant level, defining the superheat value corresponding to said substantially constant level to be SH=0; and
   calibrating the superheat sensor by using the defined SH=0 level corresponding to the constant level of the value(s) of the monitored parameter(s) as a reference point corresponding to a superheat determination of zero;
   wherein the step of calibrating comprises configuring the superheat sensor to provide a superheat determination of zero when the constant level of the value(s) of the monitored parameter(s) corresponding to the defined SH=0 level is reached.

2. The method according to claim 1, wherein the step of increasing an amount of liquid refrigerant in the evaporator comprises increasing an opening degree of the expansion valve.

3. The method according to claim 2, wherein the step of increasing an opening degree of the expansion valve is performed by gradually increasing the opening degree.

4. The method according to claim 1, further comprising a step of decreasing a secondary fluid flow across the evaporator to increase the amount of liquid refrigerant in the evaporator.

5. The method according to claim 1, wherein the step of increasing an amount of liquid refrigerant in the evaporator comprises decreasing a rotational speed of the compressor.

6. The method according to claim 1, wherein the step of monitoring one or more parameters comprises monitoring a temperature of refrigerant leaving the evaporator.

7. The method according to claim 1, wherein the step of monitoring one or more parameters comprises monitoring a distance between a first wall part and a second wall part of the superheat sensor, said distance depending on a pressure as well as a temperature of refrigerant leaving the evaporator.

8. The method according to claim 1, further comprising the step of storing in a database the substantially constant level(s) of the value(s) of the monitored parameter(s) corresponding to the superheat value defined to be SH=0.

9. The method according to claim 8, wherein the step of calibrating the superheat sensor is further performed on the basis of information previously stored in the database.

10. The method according to claim 1, wherein the step of defining the superheat value SH=0 comprises solving a linear equation.

11. The method according to claim 1, wherein the step of monitoring one or more parameters is performed by means of the superheat sensor.

* * * * *